3,775,390
POLYMERIZATION OF CHLOROPRENE IN THE PRESENCE OF A BENZOTHIAZOLESULFENAMIDE

Ausat Ali Khan, Newark, Del., assignor to E. I. du Pont de Nemours and Company, Wilmington, Del.
No Drawing. Filed Feb. 18, 1972, Ser. No. 227,658
Int. Cl. C08f 3/32, 15/00, 15/24
U.S. Cl. 260—92.3     15 Claims

ABSTRACT OF THE DISCLOSURE

Polymerizing chloroprene in an alkaline aqueous emulsion in the presence of both an organic sulfur-containing chain transfer agent and a benzothiozolesulfenamide.

BACKGROUND OF THE INVENTION

This invention relates to a process for making chloroprene polymers having improved tensile strength and tear strength.

Neoprenes, that is a chloroprene polymers and copolymers, have been commercially available for many years and have enjoyed wide acceptance as versatile elastomers having good resistance to oils, solvents, and greases, superior aging resistance, and flame resistance, and good film strength. Such chloroprene polymers are prepared in aqueous emulsions in the presence of free radical catalysts and the molecular weight of the resulting polymer has been controlled by employing sulfur-containing chain transfer agents. Despite the already superior properties of these polymers, still further improvements are constantly being sought. Since many uses of chloroprene polymers require a material having high tensile strength and good tear resistance, these properties are especially important.

SUMMARY OF THE INVENTION

It has now been found that chloroprene polymers having improved tensile strength and tear strength can be prepared if there is present in the polymerization system a benzothiazolesulfenamide and an organic sulfur-containing chain transfer agent. More particularly, the present invention is directed to a process for making chloroprene polymers which comprises polymerizing chloroprene in an alkaline aqueous emulsion in the presence of both an organic sulfur-containing chain transfer agent and at least about 0.1 part by weight per hundred parts monomer of a benzothiazolesufenamide having the structure

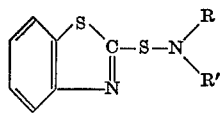

wherein R and R' are independently alkyl, cycloalkyl, or aralkyl radicals and one of R and R' can be hydrogen or R and R' together form a saturated ring with the nitrogen. Preferably, the sulfenamide is added to monomer before polymerization.

DETAILED DESCRIPTION OF THE INVENTION

The polymerization of chloroprene, except for the presence of the benzothiazolesulfenamide, is carried out in a conventional manner in an aqueous emulsion using a free radical polymerization catalyst, e.g., alkali metal persulfates of organic peroxides or hydroperoxides, at temperatures between 0° and 80° C., generally between 30° and 50° C. As is well known in the art, polymerization can be carried to a predetermined desired degree and stopped by use of conventional "short-stopping" agents, such as those disclosed in Pat. 2,576,009. According to the present invention, a benzothiazolesulfenamide and an organic sulfur-containing chain transfer agent are present in the process during polymerization.

Benzothiazolesulfenamides having the structure illustrated in the formula above can be used in the process of this invention. The particular substituents represented by R and R' in the formula can vary widely but generally represent alkyl, cycloalkyl, or aralkyl radicals, and one of R or R' can be hydrogen, or R and R' taken together can form a saturated ring with the nitrogen.

The number of carbon atoms in the alkyl, cycloalkyl, or aralkyl radicals is not critical and the upper limit is a matter of practical considerations. These radicals are preferably hydrocarbon radicals, although they may contain substituents which do not detrimentally affect polymerization. Generally, alkyl radicals will contain one to about 12 carbon atoms. The cycloalkyl rings will usually contain 5 to 7 carbon atoms, although polycyclic rings can be used containing up to 12 carbon atoms. The aralkyl radicals that are used are those in which an aryl radical, preferably phenyl, is attached to the alkyl or a cycloalkyl radical. The cycloalkyl radicals can be substituents on the alkyl radicals or the cycloalkyl radicals can be substituted with alkyl radicals or other cycloalkyl radicals. Representative examples of suitable NRR' radicals of the above type include diethylamino, dimethylamino, diisopropylamino, tert-butylamino, octylamino, (1-ethylcyclohexyl)amino, cyclohexylcyclopentylamino, (1,1,3,3 - tetramethylbutyl) amino, dodecylamino, benzylamino, (α-methylbenzyl) amino, and diphenethylamino.

When the —NRR' of the above formula forms a saturated ring, it may be morpholine or a saturated ring containing only carbon and hydrogen in addition to the nitrogen. In general, each ring will contain 5 to 7 members, including the nitrogen although polycyclic rings may contain, for example, up to 12 members. The rings may be substituted with hydrocarbon radicals, particularly with alkyl, cycloalkyl, or aryl hydrocarbon radicals containing up to 6 carbon atoms. Representative examples of radicals of the type in which —NRR' is part of a cyclic structure are morpholino (i.e., 4-morpholinyl), 2,6-dimethylmorpholino, 3,5-dimethylmorpholino, piperidino (i.e., 1-piperidyl), pyrrolidinyl, hexahydro-1-azepinyl, 3-azabicyclo[3.2.0]hept-3-yl, and 3-azabicyclo[3.2.2]non-3-yl.

The amount of benzothiazolesulfenamide present in the polymerization system is at least from about 0.1 part per 100 parts of monomer. This amount is needed to have the desired effect on properties of the polymer; and although larger amounts can be added without detrimental effects, in general, no more than 2 parts per 100 parts monomer is required.

Organic sulfur-containing chain transfer agents are present in the emulsion during polymerization. Usually, the chain transfer agents are alkyl mercaptans or dialkyl xanthogen disulfides. The alkyl mercaptans generally have chain lengths of about from 4 to 20 carbon atoms. The alkyl radicals may be straight-chained or branched and the mercaptans may be primary, secondary, or tertiary. It is preferred that the alkyl radicals have about 8 to 16 carbon atoms. Examples include octyl mercaptan, dodecyl mercaptan, tert-dodecyl mercaptan, tridecyl mercaptan, and mixtures of mercaptans derived from coconut oil (often called lauryl mercaptan or technical dodecyl mercaptan).

The dialkyl xanthogen disulfides can be represented by the structure:

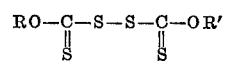

wherein R and R' are alkyl radicals having 1 to 8 carbon atoms. Examples of suitable alkyl radicals are methyl, ethyl, propyl, isopropyl, and the various isomeric butyl, amyl, hexyl, heptyl, and octyl radicals. The preferred dialkyl xanthogen disulfides are those in which each alkyl radical has 1 to 4 carbon atoms, especially diethyl xanthogen disulfide.

In order for the benzothiazolesulfenamide to have the desired beneficial effect on the properties of the final polymer, it must be present during polymerization. Preferably, the sulfenamide is added to the monomer prior to polymerization but can be added during polymerization. While the mechanism of this effect is not understood, it is believed that the sulfenamide reacts with part or all of the chain-transfer agent. The reaction product then acts as a different chain-transfer agent and portions thereof are incorporated as terminal groups on the polymer.

The amount of chain transfer agent to be used in the polymerization process will depend on the desired viscosity of the final polymer. In general, the amount of chain transfer agent used ranges from about 0.1 to 1 part per hundred parts of monomer.

The concentration of organic monomer present in the starting emulsion can vary within a wide range. In general, 30 to 55% by weight, based on the total weight of the emulsion, is the range of concentrations of organic monomer used in the preparation of the polymer. It is to be understood that up to 50% of the chloroprene can be replaced by another copolymerizable monomer. Representative comonomers that can be used in the process include vinyl aromatic compounds, such as styrene, the vinyl toluenes, and vinylnaphthalenes; aliphatic conjugated diolefin compounds such as 1,3-butadiene, isoprene, 2,3-dimethyl-1,3-butadiene, and 2,3-dichloro-1,3-butadiene; vinyl ethers, esters, and ketones, such as methyl vinyl ether, vinyl acetate, and methyl vinyl ketone; esters, amines, and nitriles of acrylic and methacrylic acids, such as ethyl acrylate, methyl methacrylate, methacrylamide, and acrylonitrile.

If a portion of the polymer is to be in gel form, as shown in Example 3, gel can be prepared by including in the mixture of monomers up to 5% of a cross-linking monomer having 2 or more polymerizable double bonds. Examples of such cross-linking monomers are esters of acrylic or methacrylic acid with polyhydric alcohols or phenols or polyvinyl aromatic compounds.

Conventional emulsifying agents employed in chloroprene polymerization processes are used in the present process for preparing the monomer emulsion and include the water-soluble salts, particularly the sodium, potassium, or ammonium salts of compounds of the following types: long-chain fatty acids; rosins, or rosin derivatives, such as wood rosin, tall oil rosin, disproportionated rosins, or partially polymerized rosin; higher alcohol sulfates; and arylsulfonic acids such as alkylbenzenesulfonic acids and the condensation product of formaldehyde with a naphthalenesulfonic acid.

The chloroprene polymers prepared according to this invention, when vulcanized, i.e., cured, by conventional techniques, for example, methods described in "The Neoprenes," 1963, E. I. du Pont de Nemours & Co., or in Du Pont Chemicals for Elastomers Bulletin No. 63, NA–101, show a significant increase in tensile strength and in tear strength as compared with polymers prepared without the addition of a benzothiazolesulfenamide.

For a clearer understanding of the invention, the following specific examples are given as being illustrative:

EXAMPLES

Example 1

Chloroprene polymers are prepared by polymerizing chloroprene in an alkaline aqueous emulsion using the following recipe (parts are by weight):

| | Parts | |
|---|---|---|
| | A | B[1] |
| Chloroprene | 100 | 100 |
| Disproportionated rosin ("Resin 731-S," Hercules) | 3 | 3 |
| Diethyl xanthogen disulfide | 0.5 | 0.45 |
| 2-(morpholinothio) benzothiazole | 0.5 | 0 |
| Water | 91.5 | 91.5 |
| Sodium hydroxide | 0.55 | 0.55 |
| Sodium salt of condensate of formaldehyde and a naphthalene-sulfonic acid ("Lomar" PW, Nopco Chemical Co.) | 0.4 | 0.4 |
| Sodium sulfite | 0.3 | 0.3 |

[1] Control.

Polymerization is carried out at 40° C. to monomer conversion of 67–70% using as catalyst a 1.5% aqueous solution of potassium persulfate containing 0.075% of sodium 2-anthraquinonesulfide. Polymerization is stopped by adding 1.86 parts of an emulsion containing about 0.017 part each of phenothiazine and 4-tert-butylpyrocatechol and about 0.5 part of 2,6-di-tert-butyl-4-phenylphenol. Unreacted monomer is removed by steam stripping, the pH is adjusted to 5.6 with 30% acetic acid, and the polymer is isolated on a freeze roll. The Mooney viscosities of the isolated polymers (ML 1+2.5/100° C.) are about 50.

Samples of the isolated polymers are compounded using the following recipe:

| | Parts |
|---|---|
| Polymer | 100 |
| Stearic acid | 0.5 |
| N-phenyl-1-naphthylamine | 2 |
| Magnesia | 1 |
| Semi-reinforcing furnace black | 58 |
| Aromatic process oil ("Sundex" 790, Sun Oil Co.) | 10 |
| Paraffin | 1 |
| Zinc oxide | 5 |
| Accelerator (adduct of dimethylethanolamine with 2,4-tolylene diisocyanate) | 2.17 |

Samples of the polymer are cured in a mold under pressure for 30 minutes at 153° C. The tensile properties are measured using ASTM Method D 412–64 T. The tear strength is measured by ASTM Method D 470–71, Section 7.6.

The results of the tests are shown in Table I.

TABLE I

| Polymer | A | B[1] |
|---|---|---|
| Modulus at 200% elongation, p.s.i. | 1,500 | 1,900 |
| Tensile strength at break, p.s.i. | 3,500 | 3,300 |
| Elongation at break, percent | 430 | 325 |
| Tear strength, pounds/inch: | | |
| Original | 44 | 20 |
| After aging 3 days at 121° C | 31 | 27 |

[1] Control.

EXAMPLE 2

A mercaptan-modified chloroprene polymer is prepared using the following recipe for the monomer emulsion:

| | Parts |
|---|---|
| Chloroprene | 100 |
| Disproportionated rosin | 3 |
| Dodecyl mercaptan | 0.24 |
| 2-(morpholinothio)benzothiazole | 0.2 |
| Water | 90.5 |
| Sodium hydroxide | 0.55 |
| Sodium salt of condensate of formaldehyde and a naphthalenesulfonic acid ("Lomar" PW, Nopco Chemical Co.) | 0.4 |
| Sodium sulfite | 0.3 |

Polymerization is carried out at 40° C. using the same catalyst as in Example 1. Polymerization is stopped at 72.6% monomer conversion by adding 1.4 part of a stabilizer emulsion containing 1% each of phenothiazine and 4-tert-butylpyrocatechol. Unreacted monomer is removed and the polymer is isolated as in Example 1.

The isolated polymer has a Mooney viscosity (ML 1+2.5/100° C.) of 57. Samples of the polymer are compounded using the following recipe:

|   | Parts |
|---|---|
| Polymer | 100 |
| Stearic acid | 0.5 |
| N-phenyl-1-naphthylamine | 2 |
| Semi-reinforcing furnace black | 58 |
| Naphthenic oil | 10 |
| Paraffin | 1 |
| Magnesia | 2 |
| Zinc oxide | 5 |
| Tetramethylthiourea | 1 |
| 2-(cyclohexylaminothio)benzothiazole(delayed-action accelerator) | 0.75 |

Samples are cured in a mold under pressure for 30 minutes at 153° C.

The properties of cured samples are determined as in Example 1. The results are shown in Table II. For comparison the properties are shown of a conventional polymer prepared as described above except that no 2-(morpholinothio)benzothiazole is used in the polymerization recipe.

TABLE II

|   | A[1] | B[2] |
|---|---|---|
| Modulus at 200% elongation, p.s.i | 1,900 | 1,900 |
| Tensile strength at break, p.s.i | 3,350 | 2,950 |
| Elongation at break, percent | 320 | 290 |
| Tear strength, lbs./in | 23 | 20 |

[1] Test sample.
[2] Conventional sample.

EXAMPLE 3

A mixture of a benzene-soluble (sol) and benzene-insoluble (gel) polychloroprene is prepared. Two separate latexes are prepared using the following recipes for the monomer emulsions:

|   | Parts | |
|---|---|---|
|   | A, gel | B, sol |
| Chloroprene | 97 | 100 |
| Ethylene dimethacrylate | 3 | 0 |
| Disproportionated rosin | 3 | 3 |
| Diethyl xanthogen disulfide | 0.4 | 0.45-0.5 |
| Water | 108.5 | 91.5 |
| Sodium hydroxide | 0.67 | 0.55 |
| 2-(morpholinothio)benzothiazole | 0.15 | 0.35 |
| Sodium salt of condensate of formaldehyde and a naphthalene-sulfonic acid | 0.7 | 0.4 |
| Sodium 2-anthraquinonesulfonate | 0.007 | 0 |

Polymerization is carried out at 40° C. using as a catalyst a 1.5% aqueous solution of potassium persulfate and 0.075% sodium 2-anthraquinonesulfonate.

For the sol polymer, polymerization is stopped at about 70% monomer conversion. In the preparation of the gel polymer, polymerization is carried to about 95% conversion by addition in the later stages of polymerization of a 5% aqueous solution of potassium persulfate and raising the temperature to 45° C. Polymerization is stopped by adding an emulsion containing phenothiazine and 4-tert-butylpyrocatechol. In the case of the gel emulsion the shortstop emulsion also contains about 0.9 part of 2,6-di-tert-butyl-4-phenylphenol. The two latexes are mixed in proportions to give 78 parts of sol polymer and 22 parts of gel polymer. Unreacted monomer is removed by steam stripping and the polymer is isolated as in Example 1.

Samples of the isolated polymer are compounded using the following recipe.

|   | Parts |
|---|---|
| Polymer | 100 |
| Stearic acid | 0.5 |
| N-phenyl-1-naphthylamine | 2 |
| Magnesia | 4 |
| Clay (Suprex clay, J. M. Huber Corp.) | 100 |
| Naphthenic oil | 12 |
| Paraffin | 1 |
| Zinc oxide | 5 |
| 2-mercapto-2-imidazoline | 1 |
| 2-benzothiazolyl disulfide | 0.75 |

Samples are cured under pressure in a mold for 30 minutes at 153° C. The results of the tests are shown in Table III. They are compared with results from a conventional sample in which no benzothiazolesulfenamide is present in the polymerization system.

TABLE III

|   | A[1] | B[2] |
|---|---|---|
| Modulus at 200% elongation, p.s.i | 750 | 750 |
| Tensile strength at break, p.s.i | 2,600 | 2,400 |
| Elongation at break, percent | 670 | 700 |
| Tear strength, lbs./in | 74.3 | 69.8 |

[1] Experimental sample.
[2] Conventional sample.

I claim:

1. A process for making chloroprene polymers which comprises polymerizing chloroprene in an alkaline aqueous emulsion in the presence of both an organic sulfur-containing chain transfer agent selected from the group consisting of alkyl mercaptans or dialkyl xanthogen disulfides and at least about 0.1 part by weight per 100 parts monomer of a benzothiazolesulfenamide having the structure

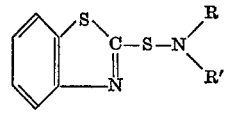

wherein R and R' are independently alkyl, cycloalkyl, or aralkyl radicals and one of R or R' can be hydrogen, or R and R' together can form with the nitrogen, a morpholine ring or a saturated ring containing only carbon and hydrogen in addition to the nitrogen, which rings may be substituted with hydrocarbon radicals.

2. A process of claim 1 wherein about from 0.1 to 2 parts by weight per 100 parts monomer of a benzothiazolesulfenamide is added.

3. A process of claim 1 wherein R and $R_2$ are alkyl radicals having from 1 to 12 carbon atoms and one of R or R' can be hydrogen.

4. A process of claim 1 wherein the sulfenamide is N,N-diethyl-1-benzothiazolesulfenamide.

5. A process of claim 1 wherein the sulfenamide is N,N-diisopropyl-2-benzothiazolesulfenamide.

6. A process of claim 1 wherein the sulfenamide is N-tertiary butyl-2-benzothiazolesulfenamide.

7. A process of claim 1 wherein the sulfenamide is N-octyl-2-benzothiazolesulfenamide.

8. A process of claim 1 wherein R and R' are cycloalkyl radicals having 5 to 7 carbon atoms and one of R or R' can be hydrogen.

9. A process of claim 1 wherein the sulfenamide is 2-(2,6-dimethylmorpholinothio)benzothiazole.

10. A process of claim 1 wherein the sulfenamide is 2-(morpholinothio)benzothiazole.

11. A process of claim 10 wherein the organic sulfur-containing chain transfer agent is a dialkyl xanthogen disulfide.

12. A process of claim 11 wherein the organic sulfur-containing chain transfer agent is diethyl xanthogen disulfide.

13. A process of claim 10 wherein the organic sulfur-containing chain transfer agent is an alkyl mercaptan.

14. A process of claim 13 wherein the organic sulfur-containing chain transfer agent is dodecyl mercaptan.

15. A process of claim 10 wherein the sulfenamide is added to the monomer before polymerization.

References Cited
UNITED STATES PATENTS 3,207,815  9/1965  Joo _____ 260—862

JOSEPH L. SCHOFER, Primary Examiner
C. A. HENDERSON, Jr., Assistant Examiner

U.S. Cl. X.R.

260—63 R, 80.3 E, 80.3 N, 80.7, 82.7, 85.5 XA, 86.3, 87.1